United States Patent
El Alami

(10) Patent No.: US 9,778,070 B2
(45) Date of Patent: Oct. 3, 2017

(54) SENSOR DEVICE FOR USE IN DETERMINING AN ANGLE OF ROTATION

(71) Applicant: CONTINENTAL AUTOMOTIVE GMBH, Hannover (DE)

(72) Inventor: Abdullah El Alami, Liederbach (DE)

(73) Assignee: Continental Automotive GmbH, Hannover (DE)

( * ) Notice: Subject to any disclaimer, the term of this patent is extended or adjusted under 35 U.S.C. 154(b) by 87 days.

(21) Appl. No.: 14/409,543

(22) PCT Filed: Jun. 14, 2013

(86) PCT No.: PCT/EP2013/062428
§ 371 (c)(1),
(2) Date: Dec. 19, 2014

(87) PCT Pub. No.: WO2014/001106
PCT Pub. Date: Jan. 3, 2014

(65) Prior Publication Data
US 2015/0198464 A1    Jul. 16, 2015

(30) Foreign Application Priority Data

Jun. 29, 2012 (DE) .......................... 10 2012 211 383

(51) Int. Cl.
*G01D 5/14* (2006.01)
*G01B 7/30* (2006.01)

(52) U.S. Cl.
CPC ........ *G01D 5/14* (2013.01); *G01B 7/30* (2013.01)

(58) Field of Classification Search
CPC .................................... G01B 7/30; G01D 5/14
See application file for complete search history.

(56) References Cited

U.S. PATENT DOCUMENTS

| | | | |
|---|---|---|---|
| 6,304,078 B1* | 10/2001 | Jarrard ................. | G01B 7/003 324/207.2 |
| 2002/0078937 A1 | 6/2002 | Kiessling | |
| 2005/0030012 A1* | 2/2005 | Kunz-Vizenetz ...... | G01D 5/145 324/207.25 |
| 2006/0066282 A1* | 3/2006 | Soeda .................. | H02K 11/215 318/685 |
| 2009/0146650 A1 | 6/2009 | Hatanaka et al. | |
| 2009/0322325 A1* | 12/2009 | Ausserlechner ....... | G01D 5/145 324/260 |

FOREIGN PATENT DOCUMENTS

| | | |
|---|---|---|
| DE | 10 2005 022 128 | 1/2006 |
| WO | WO/0146651 A2 | 6/2001 |
| WO | WO 2004/063672 A1 | 7/2004 |

* cited by examiner

*Primary Examiner* — Patrick Assouad
*Assistant Examiner* — Haidong Zhang
(74) *Attorney, Agent, or Firm* — Cozen O'Connor

(57) ABSTRACT

A sensor device includes: at least one magnetic field generator having an end face line, the at least one magnetic field generator being configured to determine an angle of rotation by use of at least one sensor unit; and the at least one sensor unit configured to detect a magnetic flux density representative of the angle of rotation about an axis of rotation, which axis of rotation lies in a magnet plane of the at least one magnetic field generator and runs perpendicularly to the end face line. The magnetic field generator is formed as a dipole magnet with a north pole and a south pole. A pole separation plane separates the north pole and south pole.

9 Claims, 4 Drawing Sheets

SENSOR DEVICE FOR USE IN DETERMINING AN ANGLE OF ROTATION

CROSS-REFERENCE TO RELATED APPLICATIONS

This is a U.S. national stage of application No. PCT/EP2013/062428, filed on 14 Jun. 2013, which claims priority to the German Application No. DE 10 2012 211 383.5 filed 29 Jun. 2012, the content of both incorporated herein by reference.

BACKGROUND OF THE INVENTION

1. Field of the Invention

The invention relates to a magnetic field generator and to a sensor device for use in determining an angle of rotation using a sensor unit configured to detect the magnetic flux density.

2. Related Art

Angles of rotation can be determined by the use of various sensors. Thus, for example, a sensor using the Hall effect may be used with a Hall element. In this case, the Hall element is, for example, placed eccentrically over an axis of rotation of a permanent magnet about which the angle of rotation is formed. In this connection, the component of the flux density of the magnetic field generated by the permanent magnet that is parallel to the axis of rotation is evaluated for example. The measuring principle is based on the fact that, in the case of a complete rotation, the flux density component has a sinusoidal signal profile.

WO 2004/063672 A1 discloses an arrangement for determining the position of a magnetic-field-sensitive sensor unit in a magnetic field of a magnet arrangement.

US 2002/0078937 A1 discloses a device for detecting a direction of rotation of an internal combustion engine by means of a magnet wheel which moves past an electrical ignition coil.

U.S. Pat. No. 6,304,078 B1 discloses a non-contacting linear position sensor that has bipolar tapered magnets.

WO 01/46651 A2 discloses a sensor for measuring displacement, which comprises a magnet arrangement that has a housing for fastening to one of two elements that are movable in relation to one another.

SUMMARY OF THE INVENTION

An object of the invention is to provide a sensor device for use in determining an angle of rotation that contributes to allowing the angle of rotation to be determined precisely.

The invention is distinguished, according to one aspect, by a sensor device, which has at least one magnetic field generator for use in determining an angle of rotation by at least one sensor unit, and the at least one sensor unit, which is configured to detect the magnetic flux density that is representative of the angle of rotation. The magnetic field generator is formed as a dipole magnet with a north pole and a south pole. It has a magnet plane, which in the absence of other magnetic-field-forming bodies is flowed through at right angles by all the magnetic field lines. Furthermore, it has an end-face line, which at the end face lies on the surface of the magnetic field generator and on the magnet plane. Furthermore, it has an orthogonal plane, which is orthogonal to the pole-separating plane and in which the end-face line lies. The magnetic field generator has an end face, which has a north-pole end face and a south-pole end face. The end face is elevated with respect to the orthogonal plane at at least one point in the orthogonal direction in relation to the orthogonal plane. Furthermore, the magnetic field generator has a projection line, which projects an elevated point of the end face onto the orthogonal plane, at least part of the projection line between the elevated point of the end face and its projection on the orthogonal plane lying within the magnetic field generator. For example, the elevated point is the most elevated point of the end face. The sensor unit is positioned facing the end face of the magnetic field generator, parallel to the orthogonal plane, and is arranged movably in relation to the magnetic field generator.

In this way, the magnetic field generated by the magnetic field sensor can be adapted to the sensor unit such that it is possible to determine an angle precisely and also to realize smaller magnetic field generators, whereby space is saved. Furthermore, less costly magnetic materials can be used, such as, for example, hard ferrites instead of rare-earth-based magnets. In addition, the distance between the sensor unit and the magnetic field generator can also be increased, and the tolerance to axial offsetting is increased by the special form of the magnetic field generator.

In particular, for each south-pole and north-pole end face, the magnetic field generator has at least one most elevated point, at which at least part of the respective projection line between the respective most elevated point and its projection on the orthogonal plane lies within the magnetic field generator.

The magnet plane may also be referred to hereinafter as the pole-separating plane.

According to an advantageous refinement, the magnetic field generator has a round base area with respect to the orthogonal plane. Thus, if the magnetic field generator is placed on a round shaft, the surface area can be used in the best possible way.

According to a further advantageous refinement, the north-pole end face and the south-pole end face of the magnetic field generator have a planar surface area at least in a partial region. This makes the production process easier, whereby costs can be saved.

According to a further advantageous refinement, the north-pole end face and the south-pole end face of the magnetic field generator have a convex surface area at least in a partial region.

According to a further advantageous refinement, the north-pole end face and the south-pole end face of the magnetic field generator have a concave surface area at least in a partial region.

According to a further advantageous refinement, the magnetic field generator comprises a hard-ferrite magnet. A hard-ferrite material, such as for example a mixture of iron oxide ($Fe_2O_3$) and barium oxide (BaO), allows the magnet to be produced at a favorable price.

According to a further advantageous refinement, the magnetic field generator comprises a plastic-bonded magnetic material. By combining the magnetic powder with polymer materials, such as for example various polyamides (PA6/PA12) or polyphenylene sulfide (PPS), more flexible magnets can be produced.

According to a further advantageous refinement, the magnetic field generator has a gap angle that is defined by two straight lines. The two lines lie in a plane orthogonal to the pole-separating plane and to the orthogonal plane. They intersect the end-face line, one of the lines passing through the most elevated point of the south-pole end face and the other line passing through the most elevated point of the north-pole end face. The gap angle lies in an angular range between 30° and 170°. A particularly favorable refinement of the magnetic field of the magnetic field generator can be achieved in the angular range.

According to a second aspect, a sensor device has at least one magnetic field generator according to the first aspect, and a sensor unit, which is designed for detecting the magnetic flux density. The sensor unit is positioned facing the end face of the magnetic field generator, parallel to the orthogonal plane. It is arranged movably in relation to the magnetic field generator.

BRIEF DESCRIPTION OF THE DRAWINGS

Exemplary embodiments of the invention are explained in more detail below on the basis of the schematic drawings, in which.

DETAILED DESCRIPTION OF THE PRESENTLY PREFERRED EMBODIMENTS

Figure 1:
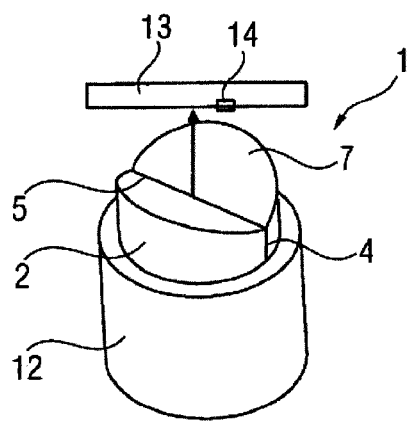
FIG. 1 shows a first exemplary embodiment of a sensor device, which has a magnetic field generator and a sensor unit.

Elements of the same structural design or function are identified by the same reference numerals throughout the figures.

A sensor device 1 (FIG. 1) has a magnetic field generator 2 and a sensor unit 13. The sensor unit 13 has at least one sensor element 14. The sensor element 14 is configured to generate a measuring signal, which is representative of a flux density component of the magnetic field that the magnetic field generator 2 generates. The sensor unit 13 has, for example, two to eight sensor elements 14. They are respectively arranged in pairs concentrically around the center point of the sensor unit. As a result, it is particularly easy to compensate for concentricity deviations of the center point of the magnetic field generator and the center point of the sensor unit. The sensor unit 13 is arranged axially parallel to the magnetic field generator 2. The magnetic field generator 2 is typically fitted on a shaft 12. The magnetic field generator 2 has a pole-separating plane 4, which separates the north pole from the south pole. The magnetic field generator 2 also has an end-face line 5, which at the end face lies on the surface of the magnetic field generator 2 and on the pole-separating plane 4. The magnetic field generator 2 also has an orthogonal plane 6, which is orthogonal to the pole-separating line 4 and in which the end-face line 5 lies. Furthermore, the magnetic field generator 2 has an end face 7. The end face 7 is elevated with respect to the orthogonal plane 6 at at least one point in the orthogonal direction in relation to the orthogonal plane 6.

Figure 2:
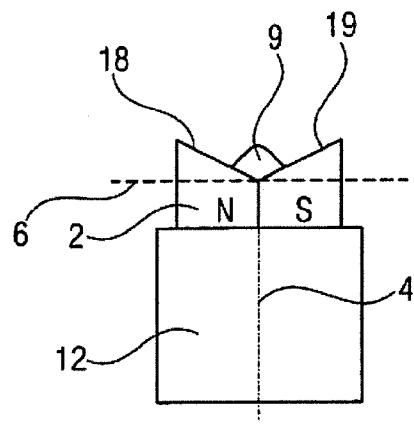
FIG. 2 shows a lateral view of the magnetic field generator according to the first exemplary embodiment.

FIG. 2 shows a lateral view of the magnetic field generator according to the first exemplary embodiment. The magnetic field generator 2 is arranged at an end-face end of a shaft 12. The north pole of the magnetic field generator 2 is separated from the south pole by the pole-separating plane 4. Furthermore, the magnetic field generator 2 has a north-pole end face 18 and a south-pole end face 19, which are elevated with respect to the orthogonal plane 6 in the orthogonal direction in relation to the orthogonal plane 6. Furthermore, the magnetic field generator 2 has a gap angle 9, which is defined by two straight lines. The lines lie in a plane orthogonal to the pole-separating plane 4 and to the orthogonal plane 6. They intersect the end-face line 5. One of the lines passes through the most elevated point of the south-pole end face 19, the other line passes through the most elevated point of the north-pole end face 18. The gap angle 9 has an angular range of approximately 30° to 170°.

Figure 3:
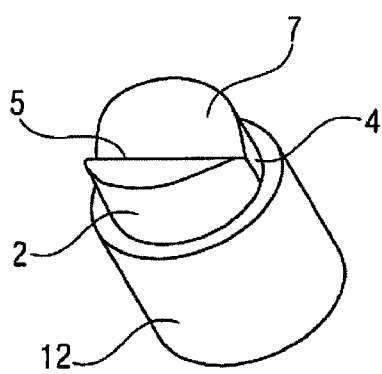
FIG. 3 shows a second exemplary embodiment of the magnetic field generator with convex pole end faces.

A further embodiment of the magnetic field generator 2 has a convex north-pole end face 18 and a convex south-pole end face 19 (FIG. 3).

Figure 4:
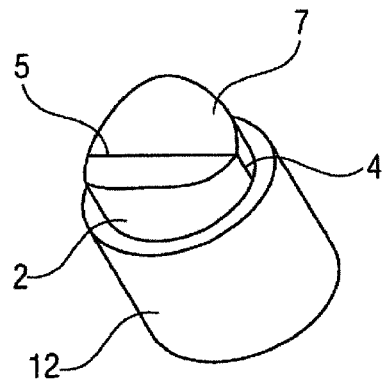
FIG. 4 shows a third exemplary embodiment of the magnetic field generator with concave pole end faces.

A further embodiment of the magnetic field generator 2 has a concave north-pole end face 18 and a concave south-pole end face 19 (FIG. 4).

Figure 5:
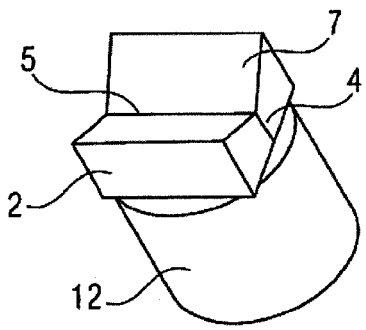
FIG. 5 shows a fourth exemplary embodiment of the magnetic field generator with a rectangle base area.

The magnetic field generator 2 may in principle also have a rectangular base area (FIG. 5) or assume a form that deviates from the cylindrical or rectangular form and a person skilled in the relevant art considers to be suitable for the respective purpose.

Figure 6:
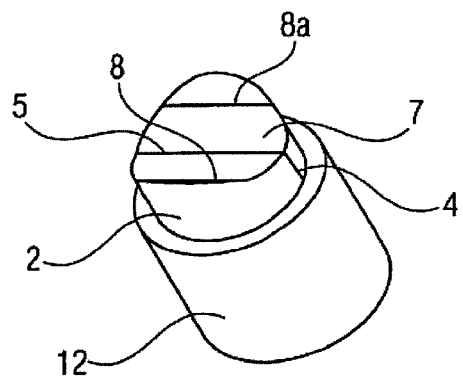
FIG. 6 shows a fifth exemplary embodiment of the magnetic field generator with partially planar pole surfaces.

The magnetic field generator 2 in the fifth exemplary embodiment (FIG. 6) has partially planar surfaces on the north-pole end face 18 and the south-pole end face 19. The end face 7 is divided into sub-faces, which are bounded by the bounding lines 8, 8a and the end-face line 5. The bounding lines 8 and 8a are parallel to the end-face line 5. This shaping allows more specific magnetic fields to be generated, whereby the magnetic field generator 2 can be particularly small and inexpensive.

Figure 7:
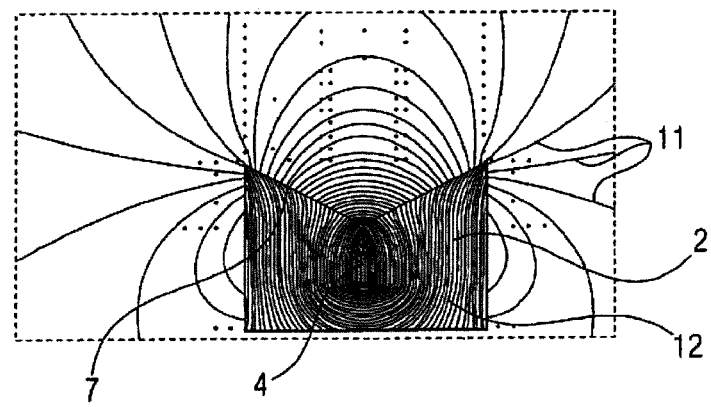
FIG. 7 shows a lateral view of magnetic field lines of the magnetic field generator according to the first exemplary embodiment.

FIG. 7 shows the profile of magnetic field lines 11 of the magnetic field generator 2 according to the first embodiment.

Figure 8:
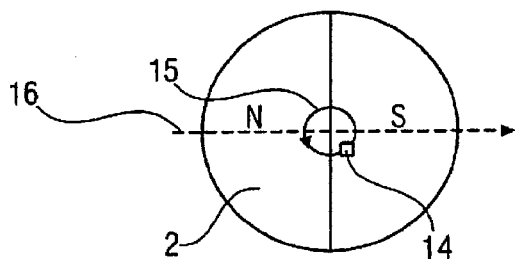
FIG. 8 shows an end view of the magnetic field generator according to the first exemplary embodiment.

FIG. 8 shows the plan view of the magnetic field generator 2 according to the first embodiment. The sensor element 14 is depicted by way of example on a circular measuring trajectory 15. The resultant flux density profile is depicted, by way of example, in FIG. 9. So that the flux density profile has a sinusoidal form, it is advantageous if the magnetic flux density has a linear profile in the region of the radius of the measuring trajectory 15 in the path of a line 16, which passes through the center point of the measuring trajectory 15 and is perpendicular to the end-face line 5.

Figure 9:
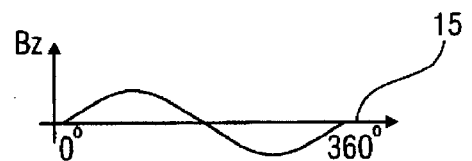
FIG. 9 shows a magnetic flux density profile.
Figure 9:
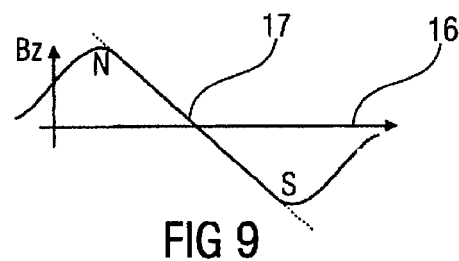

In the upper diagram of FIG. 9, an exemplary sinusoidal profile along the measuring trajectory 15 can be seen. In the case of the lower diagram, a flux density profile along the line 16 can be seen by way of example.

Figure 10A:
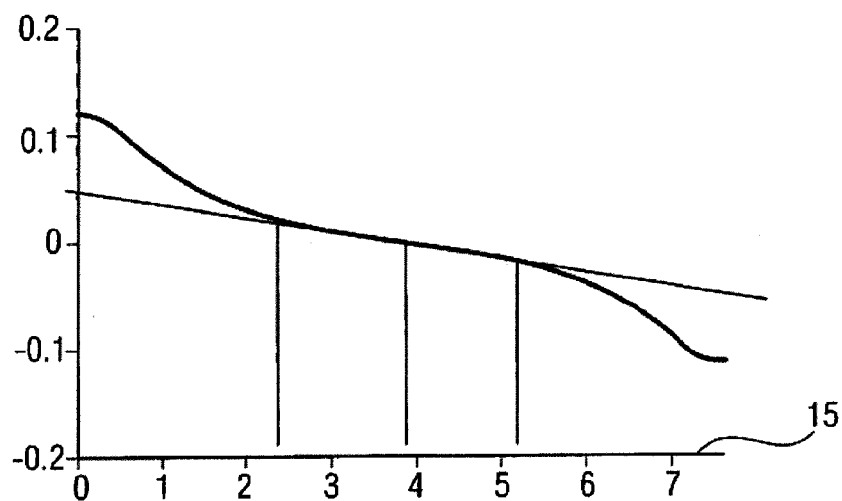
FIG. 10 shows a magnetic flux density profile with respect to the first exemplary embodiment.
Figure 10B:
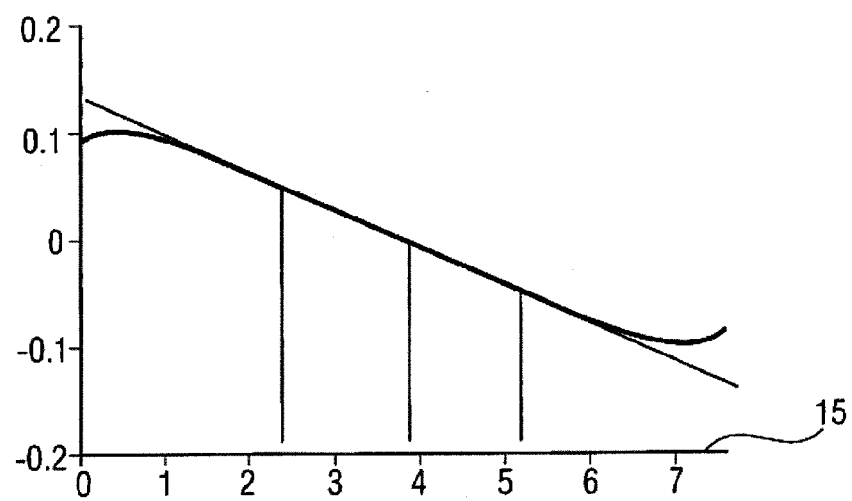

FIG. 10 shows the profile of the magnetic flux density along the line 16 in the case of a cylindrical magnetic field generator with a planar end face (upper diagram), and the magnetic field generator 2 according to the first embodiment (lower diagram). As can be seen, the linear region is greater in the second case than in the first case. Furthermore, the sinusoidal profile along the measuring trajectory 15 has a greater amplitude in the second case than in the first case. This is evident from the profile of the magnetic flux density being steeper in the second diagram than in the first diagram.

Figure 11:
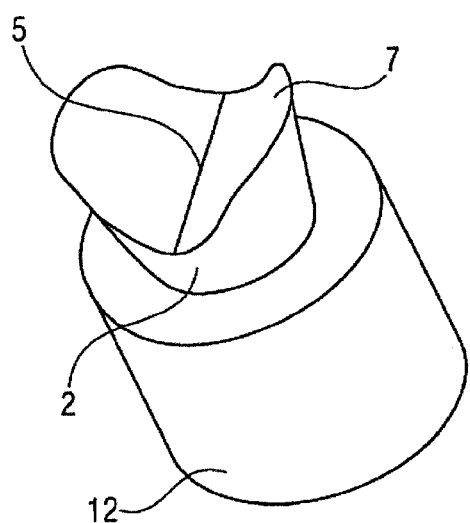
FIG. 11 shows a sixth exemplary embodiment of the magnetic field generator.

FIG. 11 shows a sixth exemplary embodiment of the magnetic field generator 2.

Exemplary embodiments in which only part of the north-pole end face 18 or the south-pole end face 19 of the magnetic field generator 2 is elevated in the orthogonal direction in relation to the orthogonal plane in the sense explained above are also possible.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A sensor device (1) comprising:
   at least one magnetic field generator (2) having an end face line (5), the at least one magnetic field generator (2) being configured to determine an angle of rotation by use of at least one sensor unit (13); and
   the at least one sensor unit (13) configured to detect a magnetic flux density representative of the angle of rotation about an axis of rotation, which axis of rotation lies in a magnet plane (4) of the at least one magnetic field generator (2) and runs perpendicularly to the end face line (5),
   wherein:
   the magnetic field generator (2) comprises a dipole magnet with a north pole and a south pole,
   the magnet plane (4) of the magnetic field generator (2), in the absence of other magnetic-field-forming bodies, is flowed through at right angles by all magnetic field lines,
   the end-face line (5) lies on the surface of the magnetic field generator (2) and on the magnet plane (4),
   the end-face line (5) of the magnetic field generator (2) lies in an orthogonal plane (6) orthogonal to the magnet plane (4),
   the magnetic field generator (2) has an end face (7) that includes the end-face line (5), the end face (7) having a north-pole end face (18) and a south-pole end face (19) that meet at and form the end face line (5), the north-pole end face (18) and the south-pole end face (19) being elevated with respect to the orthogonal plane (6) and with respect to the end-face line (5) as the north-pole end face (18) extends from the end face line (5) to a most elevated point of the north-pole end face (18), and as the south-pole end face (19) extends from the end face line (5) to a most elevated point of the south-pole end face (19), so as to form, with respect to the end-face line (5), a gap angle (9) between the north-pole end face (18) and the south-pole end face (19), and
   the magnetic field generator (2) has a projection line, which projects an elevated point of the end face (7) onto the orthogonal plane (6), at least part of the projection line between the elevated point of the end face (7) and its projection on the orthogonal plane (6) lying within the magnetic field generator (2), the sensor unit (13) being positioned facing the end face of the magnetic field generator (2), parallel to the orthogonal plane (6), and being arranged movably in relation to the magnetic field generator (2) about the axis of rotation, and
   wherein the gap angle (9) is defined by two straight lines, which:
   lie in a third plane orthogonal to the magnet plane (4) and orthogonal to the orthogonal plane (6), and
   intersect the end-face line (5), one of the lines passing through the most elevated point of the south-pole end face (19) and the other line passing through the most elevated point of the north-pole end face (18).

2. The sensor device (1) as claimed in claim 1, wherein the magnetic field generator (2) has a round base area with respect to the orthogonal plane (6).

3. The sensor device (1) as claimed in claim 1, wherein the north-pole end face (18) is planar at least in a partial region and the south-pole end face (19) is planar at least in a partial region.

4. The sensor device (1) as claimed in claim 1, wherein the north-pole end face (18) is convex at least in a partial region and the south-pole end face (19) is convex at least in a partial region.

5. The sensor device (1) as claimed in claim 1, wherein the north-pole end face (18) is concave at least in a partial region and the south-pole end face (19) is concave at least in a partial region.

6. The sensor device (1) as claimed in claim 1, wherein the magnetic field generator (2) comprises a hard-ferrite magnet.

7. The sensor device (1) as claimed in claim 1, wherein the magnetic field generator (2) comprises a plastic-bonded magnetic material.

8. The sensor device (1) as claimed in claim 1, wherein a generated magnetic flux density has a linear profile in a region of a radius of a measuring trajectory (15) in a path of a line (16) that passes through a center point of a measuring trajectory and is perpendicular to the end-face line (5).

9. A sensor device (1) comprising:
   at least one magnetic field generator (2) having an end face line (5), the at least one magnetic field generator (2) being configured to determine an angle of rotation by use of at least one sensor unit (13); and
   the at least one sensor unit (13) configured to detect a magnetic flux density representative of the angle of rotation about an axis of rotation, which axis of rotation lies in a magnet plane (4) of the at least one magnetic field generator (2) and runs perpendicularly to the end face line (5),
   wherein:
   the magnetic field generator (2) comprises a dipole magnet with a north pole and a south pole,
   the magnet plane (4) of the magnetic field generator (2), in the absence of other magnetic-field-forming bodies, is flowed through at right angles by all magnetic field lines,
   the end-face line (5) lies on the surface of the magnetic field generator (2) and on the magnet plane (4),
   the end-face line (5) of the magnetic field generator (2) lies in an orthogonal plane (6) orthogonal to the magnet plane (4),
   the magnetic field generator (2) has an end face (7) that includes the end-face line (5), the end face (7) having a north-pole end face (18) and a south-pole end face (19) that meet at and form the end face line (5), the north-pole end face (18) and the south-pole end face (19) being elevated with respect to the orthogonal plane (6) and with respect to the end-face line (5) as they extend from the end face line (5) so as to form, with respect to the end-face line (5), a gap angle (9) between the north-pole end face (18) and the south-pole end face (19), and the magnetic field generator (2) has a projection line, which projects an elevated point of the end face (7) onto the orthogonal plane (6), at least part of the projection line between the elevated point of the end face (7) and its projection on the orthogonal plane (6) lying within the magnetic field generator (2), the sensor unit (13) being positioned facing the end face of the magnetic field generator (2), parallel to the orthogonal plane (6), and being arranged movably in relation to the magnetic field generator (2) about the axis of rotation, wherein the gap angle (9) is defined by two straight lines, which:

lie in a third plane orthogonal to the magnet plane (4) and orthogonal to the orthogonal plane (6), and intersect the end-face line (5), one of the lines passing through a most elevated point of the south-pole end face (19) and the other line passing through a most elevated point of the north-pole end face (18), the gap angle (9) lying between 30° and 170°.

\* \* \* \* \*